United States Patent
Alexander

[15] 3,643,536
[45] Feb. 22, 1972

[54] SELF-ADJUSTING ROLLER GUIDE

[72] Inventor: Carl J. Alexander, Moorepark, Mich.

[73] Assignee: Wells Manufacturing Corporation, Three Rivers, Mich.

[22] Filed: June 1, 1970

[21] Appl. No.: 42,158

[52] U.S. Cl. .................................... 83/201.15, 143/160 F
[51] Int. Cl. ....................................................... B23d 55/08
[58] Field of Search ................ 83/201.15; 143/162 R, 160 F

[56] References Cited

FOREIGN PATENTS OR APPLICATIONS 56,029  12/1940  Norway ............................. 143/162 R Primary Examiner—James M. Meister
Attorney—Gordon W. Hueschen and Talivaldis Cepuritis

[57] ABSTRACT

Self-adjusting band saw roller guide comprises a yoke having a pair of opposed legs with guide roller thereon. At least one of the rollers is carried by an eccentric sleeve bearing rotatably mounted on a leg of the yoke. A torque spring means mounted on the yoke engages the eccentric sleeve bearing and urges the roller to a predetermined position.

2 Claims, 2 Drawing Figures

PATENTED FEB 22 1972
3,643,536
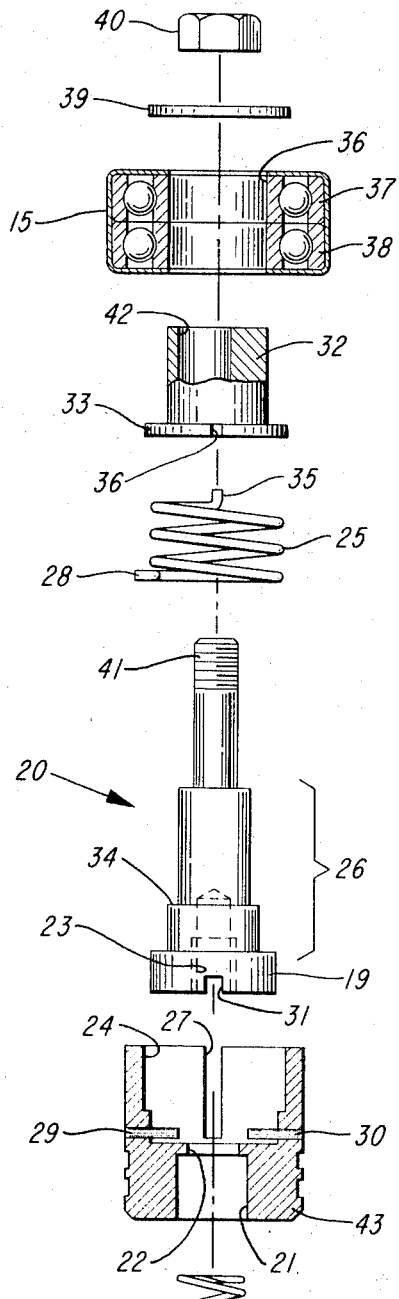
figure 2
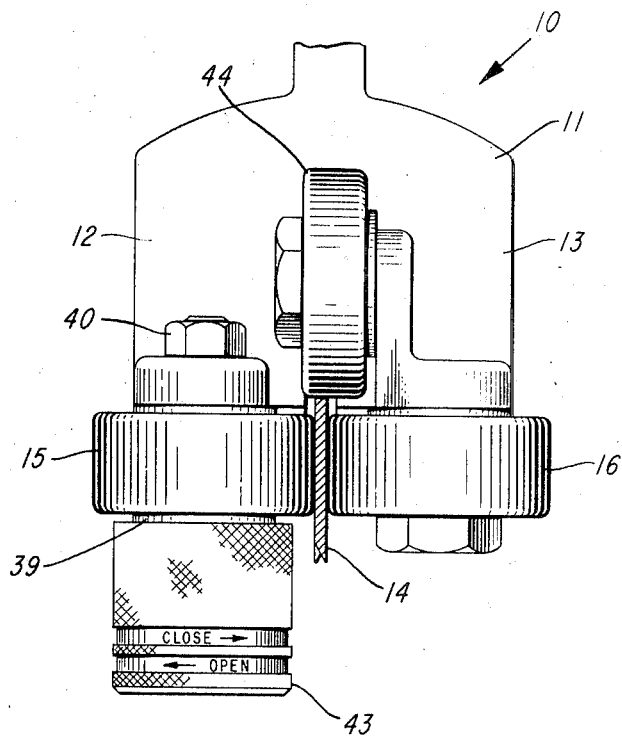
figure 1
INVENTOR.
CARL J. ALEXANDER
ATTORNEY 3,643,536

SELF-ADJUSTING ROLLER GUIDE

BACKGROUND OF THE INVENTION

Blade tracking and guiding mechanisms utilizing roller guides are a well known expedient in the band saw art. A bandsaw blade is gripped between pairs of such roller on opposite sides of a workpiece to be severed. It is also known to mount at least one of the roller guides in each pair on the yoke by means of an eccentric sleeve bearing which facilitates the adjustment of the roller guide spacing in a manner well known to the skilled bandsaw operator. Proper spacing between the roller guides is of paramount importance in order to achieve a straight cut through the workpiece. However, frequently chips on the bandsaw blade, nonuniform blade weld, or the like occurrences, will force the guides open from the desired setting, thus necessitating a shutdown of the bandsaw and a repositioning of the guides. Moreover, the guides have to be opened and again skillfully and tediously reset every time a bandsaw blade is replaced inasmuch as during normal cutting operation the roller guides bear firmly against the sides of the blade.

It is an object of the present invention to provide a self-adjusting bandsaw roller guide which maintains the desired spacing while permitting occasional chips or other foreign objects to pass freely through the guide means. A further object is to provide a roller guide which can be opened when a bandsaw blade is replaced and readily reset to the proper spacing by a quick manual operation. Still other objects will readily present themselves to one skilled in the art upon reference to the ensuing specification, the drawings, and the claims.

SUMMARY OF THE INVENTION

The present invention contemplates a roller guide at least one roller of which is held in a predetermined position against a bandsaw blade by means of a torque spring which permits the temporary opening up of the spacing as a foreign object passes through the guide, but which immediately thereafter repositions the roller guide. The present self-adjusting guide comprises a yoke provided with a pair of opposed legs which are adapted to carry guide rollers, an eccentric sleeve bearing rotatably mounted on a leg of the yoke, a torque spring means mounted on the yoke and operably engaging the eccentric sleeve bearing, and a guide roller axially mounted on the eccentric sleeve bearing. The action of the torque spring urges the roller to the desired predetermined position relative to the bandsaw blade.

BRIEF DESCRIPTION OF THE DRAWINGS

In the drawing,

FIG. 1 is a side elevation of a self-adjusting roller guide of this invention; and FIG. 2 is an exploded view of a self-adjusting guide roller embodying this invention, some parts being shown in section.

DESCRIPTION OF THE PREFERRED EMBODIMENTS

Referring to FIG. 1, roller guide 10 comprises yoke 11 having opposed legs 12 and 13. Bandsaw blade 14 is gripped between guide rollers 15 and 16, and auxiliary roller 44, also mounted on yoke 11, limits the upward deflection of blade 14 as it bears down on a workpiece (not shown). In the embodiment shown in FIG. 1, roller 15 is provided with the self-adjusting mechanism which is situated within housing 43. The outer surface of housing 43 can be knurled as shown so as to provide a more convenient grip thereon for purposes which will be set forth in detail hereinafter.

As shown in FIG. 2, housing 43 is hollow and is rotatably spring-mounted by means of spring 17 and screw 18 on the head portion 19 of screw means 20. Spring 17 is received in housing opening 21 and abuts on inner ridge 22. Screw 18 passes through opening 21 and is threadedly received within opening 23 of head portion 19.

An enlarged hollow portion 24 of housing 48 is adapted to receive therein head portion 19 of screw means 20 and also torque spring means 25 which is carried on elongated body portion 26 of screw means 20. Housing 43 is also provided with longitudinal slot 27 which receives and holds end 28 of torque spring 25. Diametrically opposed pins 29 and 30 are mounted in housing 43 and project inwardly within hollow portion 24. These pins are adapted to be received in transverse recess 31 situated in head portion 19 of screw means 20.

Body portion 26 is received by bore 42 of eccentric sleeve bearing 32 which is axially mounted thereon with peripheral flange 33 abutting against surface 34 and torque spring means 25. Flange 33 is integral with and extends outwardly around the periphery of bearing 32. End 35 of torque spring means 25 is received and held in opening 36 of flange 33.

Guide roller 15 is axially mounted through bore 36 of roller bearings 37 and 38 onto eccentric sleeve bearing 32 and the entire assembly is mounted on arm 12 of yoke 11 by means of washer 39 and nut 20 which threadedly engages threaded end portion 41 of screw means 20.

In use, nut 40 is first loosened and the entire assembly turned about the axis of screw means 20 until guide roller 15 is spaced the desired distance from guide roller 16. Usually the spacing is such that blade 14 is firmly gripped between guide rollers 15 and 16 and these rollers roll along the lateral surfaces of blade 14 as it is pulled through. After the desired spacing has been set, nut 40 is tightened and self-adjusting roller guide 10 is ready for operation. As blade 14 passes between rollers 15 and 16 bearing a chip or other foreign body on the lateral surfaces thereof, the chip will temporarily force guide roller 15 back, pivoting roller 15 and eccentric sleeve bearing about the axis of screw means 20. However, as soon as the chip has passed through, torque spring 25, reacting between stationary yoke 11 and pivoting bearing 32 returns both guide roller 15 and bearing 32 to their original preset positions with guide roller 15 bearing on blade 14 as before.

When it is desired to change or replace blade 14, housing 43 is pulled downwardly against the action of spring 17, pins 29 and 30 disengaged from transverse recess 31, and housing 43 turned 180° until pins 29 and 30 again engage recess 31. As housing 43 is turned, torque spring means 25 also turns eccentric sleeve bearing 32 which, in turn, opens up the spacing between guide rollers 15 and 16. Direction of turn for opening and closing guide 10 can be conveniently indicated on housing 43 as shown in FIG. 1. Once the blade is replaced, the aforedescribed operation is reversed, first pulling down on housing 43 so as to disengage pins 29 and 30, and guide roller 15 is automatically returned to its original predetermined position without the need of further tedious adjustments.

Inasmuch as in the "guide closed" position torque spring means 25 is usually under some tension, roller 15 and 16 bear against blade 14. In this manner, variations in bandsaw blade thickness due to wear as well as guide roller wear are constantly compensated and straight cutting by the bandsaw blade is assured.

The foregoing specification and drawing are intended as illustrative but not limiting. Still other variations and rearrangements of parts within the spirit and scope of this invention will readily present themselves to one skilled in the art.

I claim:

1. A self-adjusting roller guide for a bandsaw comprising:
   a yoke provided with a pair of opposed legs adapted to carry guide rollers;
   an eccentric sleeve bearing rotatably mounted on a leg of said yoke;
   a guide roller adapted to engage a lateral portion of a bandsaw blade axially mounted on the eccentric sleeve bearing; and
   a torque spring means mounted on said yoke, engaging said eccentric sleeve bearing and urging said roller to a predetermined position relative to the bandsaw blade.

2. A self-adjusting bandsaw roller guide having a yoke provided with a pair of opposed legs and a guide roller carried on each of said legs, said rollers being adapted to engage a bandsaw blade therebetween, which comprises:

a screw means having an elongated body portion, a head portion on one end of said body portion and provided with a transverse recess, and an externally threaded end portion on the opposite end of said body portion and adapted to engage one of said yoke legs;

a hollow substantially cylindrical housing rotatably spring-mounted on the head portion of said screw means, extending over the body portion thereof, and provided with a longitudinal slot in the side of the housing;

inwardly projecting, diametrically opposed pins within said housing adapted to engage the transverse recess in the head portion of said screw means;

a torque spring means within said housing, carried on the body portion and abutting the head portion of said screw means, and with one end thereof engaging the longitudinal slot of said housing;

an eccentric sleeve bearing axially mounted on the body portion of said screw means;

an integral, outwardly extending peripheral flange on said bearing abutting and operably engaging said torque spring means; and a guide roller axially mounted on said bearing and adapted to bear against one side of said bandsaw blade.

* * * * *